March 22, 1960  E. SCHNITZER  2,929,471
LOW PASS SHOCK STRUT
Filed Aug. 16, 1957
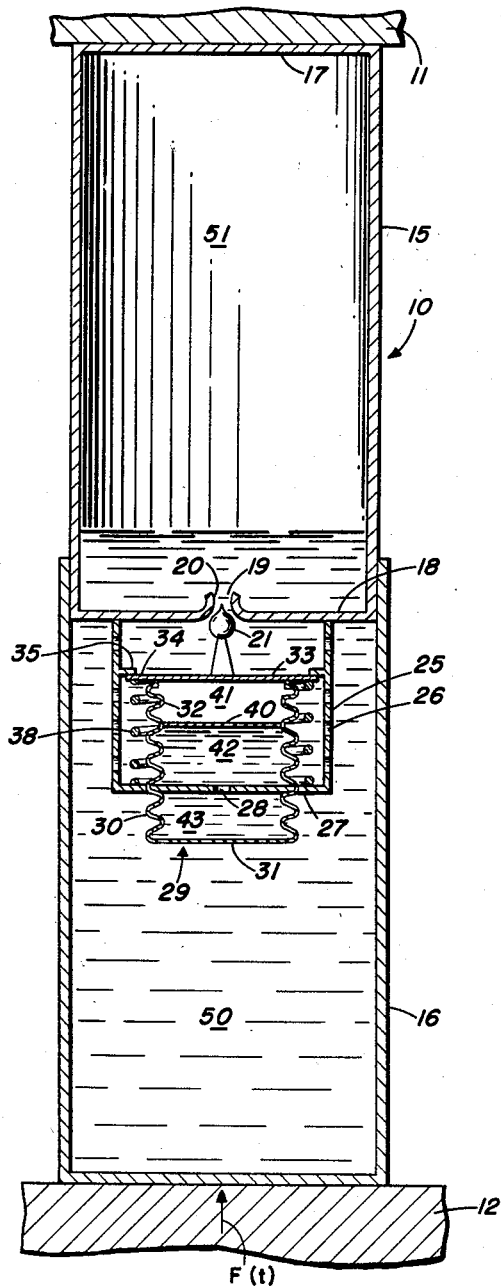
INVENTOR
EMANUEL SCHNITZER
ATTORNEYS

United States Patent Office 2,929,471
Patented Mar. 22, 1960

2,929,471

LOW PASS SHOCK STRUT

Emanuel Schnitzer, Newport News, Va.

Application August 16, 1957, Serial No. 678,752

2 Claims. (Cl. 188—96)

(Granted under Title 35, U.S. Code (1952), sec. 266)

The invention described herein may be manufactured and used by or for the Government of the United States of America for governmental purposes without the payment of any royalties thereon or therefor.

This invention relates to shock absorbers for miscellaneous loads which are capable of filtering out loads from disturbances having certain frequency ranges or certain rates of application, while retaining the required load arresting characteristics of conventional shock absorbers in the remainder of the frequency spectrum.

In common use are shock absorbers which arrest action between two bodies by means of a damping arrangement which may, for example, be composed of a piston slidable in a cylinder full of fluid suitably arranged so that when the piston is moved in the cylinder, fluid is forced through a small orifice, creating a damping force roughly proportional to the square of the relative velocity of piston and cylinder. When this absorber is incorporated in a shock strut of a vehicle, for example, between the vehicles and wheel, relative piston-cylinder movement will generate a damping action within the strut which will force the vehicle to have a reduced motion in the same direction.

Since, in the conventional absorber above described, the load is proportional to some power of the relative velocity, the higher the disturbance frequency or rate of loading, the more resistance the absorber offers to relative motion, until at high frequencies the absorber becomes practically a rigid link. This deficiency is coupled with the further deficiency, that the conventional absorber is incapable of discriminating between disturbances of various frequencies or loading rates.

The objects of the present invention are to provide a shock absorber for machine elements which is capable of filtering out selected loads having predetermined frequency ranges or rates of application; to provide a shock absorber which has relatively low inertial lag in adjusting to load changes; and to provide a shock absorber effective to reduce high frequency pulse loads of extremely rapidly applied transient motions.

Other objects and many of the attendant advantages of this invention will be readily appreciated as the same becomes better understood by reference to the following detailed description when considered in connection with the accompanying drawings wherein: the single figure is a longitudinal sectional view of a shock absorber strut embodying the invention.

Referring to the figure, the numeral 10 indicates a shock absorber strut as applied between two machine elements, as, for example, an airplane body 11 and a wheel connecting element 12. The absorber includes the cylindrical piston 15 fixedly attached, as shown, to the body and slidable within the cylinder 16 which is attached to the wheel. Both piston and coacting cylinder are hollow throughout their lengths, the piston being closed at its upper end by plate 17 and at its lower end by plate 18, plate 18 being centrally apertured by main orifice 19 with the orifice wall 20 curved inwardly to form a flow channel concentric with the metering pin or plunger.

Depending from the lower aperture plate 18 of the piston is a cage 25 the side wall of which has perforations 26 throughout its area to permit free flow of fluids into and out of the cage. The lower end of the cage 25 is closed by flat plate 27 which carries a single bleed orifice 28.

A tubular bellows tube 29 of generally cylindrical form is attached to base plate 27 of cage 25 by suitable means, the bellows section 30, with its closed end 31 extending outside the cage for roughly one-third its length, the enclosed bellows section 32 normally reaching to a point adjacent the apertured piston plate 18. The top of the bellows section 32 is closed by the attached circular plate 33, the edge 34 of the plate extending beyond the bellows edge so as to engage, at the extended position of the bellows, the lower surface of the annular inner stop or flange 35 on cage 25. A coiled spring 38 is attached to cage base 27, surrounding the bellows, the free upper spring end normally engaging the bellows plate edge 34 on its under surface and holding the plate against the cage stop flange 35.

About mid-way in bellows section 32 is a transverse plate 40 which, with the perforated plate 27, divides the bellows into three separate chambers, the top chamber 41 being entirely closed and adapted for holding a compressible medium, which might be air or some other gas, and chambers 42 and 43 adapted for holding a liquid of suitable density, the liquid in one chamber communicating with the other chamber through bleed orifice 28. The top bellows plate 33 carries fixed plunger 21 at a point opposite the main orifice 19 in piston plate 18, this plunger being contoured and dimensioned, as by a pointed end and curved sides, to form a flow channel with the curved wall of main orifice 19.

The cylinder 16 normally holds liquid 50, which, in the vertical position of the drawing, completely fills the absorber cylinder 16 and a substantial space in the piston above the base plate 18, the drawing indicating, for example, about one-seventh the piston space. The balance of piston 15 is filled with a compressible device or medium such as a gas, like air 51. Normally in the extended position the pressure of the air 51 would be above atmospheric with a tendency to separate members 15 and 16. If desired, however, the air pressure may be near atmospheric when the strut is in extended position if a spring (not shown) is carrier externally to the shock absorber.

The operation of the shock absorber will now be described, assuming application of the absorber between the body and wheel of an airplane. On ground impact of the wheel, the difference between the input and output functions is manifested by force variation with time, indicated by arrow F(t) in the figure, this force being converted into a lower cylinder pressure in the liquid 50. This pressure forces liquid through main orifice 19, compressing air 51, which yields to absorb shock.

Where the compression applied axially of the strut has a slow rate of increase, the rate of flow of liquid from bellows chamber 43 to 42 through bleed orifice 28 is sufficiently rapid to compensate for the pressure on top bellows plate 33, and, as a consequence, top plate 33 with attached plunger remains stationary and the strut transmits the full load as in the conventional fixed orifice strut. However, should the load or pulse be applied rapidly to the strut, the air volume in bellows chamber 41 decreases more rapidly than liquid can flow into chamber 42 through the constricted bleed orifice 28, and, as a result, the metering pin 21 will move downwardly against the force of spring 38, widely opening orifice 19 for rapid flow of liquid from chamber 50 to chamber 51 with a consequent rapid telescoping of the strut and generation of a small load as compared to the large load for a slow rate of increase of pressure in the lower cylinder, or for a comparable fixed orifice strut subjected to this same rapidly applied load.

From the above description it is apparent that the strut is effective for shock absorption mainly for conditions of low frequencies or rates of loading, loads of intermediate or high frequencies or rates of application not being developed with the strut. That is, motions of one main element of the shock absorber, say the end connected to the wheel, which would lead to high frequencies or rates of load application, are thus isolated from the other main element of the strut, thereby preventing the development of such rapid pulse loads in the strut. Thus, the apparatus serves not only as a load sensing element, but as a differentiator and frequency filter. For illustrative purposes, the description and operation of the shock absorber has been limited to a low band-pass strut; however, it should be understood that, with minor changes, such as inclusion of suitable dump valves, bleed orifices and diaphragms, the structure may be readily adapted to intermediate or high bands of frequencies or rates of load applications.

Attention is directed, particularly, to the fact that the metering pin control is free of inertial or frictional lag, such as might result from a heavy plunger mechanism or from the frictional effect of tube walls in the control mechanism; also, the use of a gas in chamber 41, with its sensitivity to pressure variation, insures adequate responsiveness to high frequency pulse loads.

Obviously many modifications and variations of the present invention are possible in the light of the above teachings. It is therefore to be understood that within the scope of the appended claims the invention may be practiced otherwise than as specifically described.

What is claimed is:

1. A shock absorber for relatively two movable machine parts, comprising a hollow piston fixedly connected to one machine part, a cylinder slidably engaging said piston and fixedly connected to the other machine part, a plate closing the outer end of said piston, said plate having a main orifice therein, a cage having a side wall with plural openings therein and a closed outer end wall fixed to said piston plate around said main orifice, a bellows attached to said closed cage end wall with a smaller portion thereof extending outside said cage end wall forming an outer chamber and a larger portion extending inside said cage, a plate closing the inner end of said bellows, said bellows plate having a projecting annular flange, stops on the inner side of said cage side wall for limiting axial movement of said bellows, a spring surrounding said bellows and engaging said closed cage end plate and inner bellows plate flange for holding said bellows normally in extended position with the inner bellows plate flange contacting said cage stops, a closed plate extending transversely across said bellows between the bellows end plate and the cage end wall forming adjacent and separated bellows chambers inside said cage, and a pin attached to said bellows end plate opposite said piston end plate main orifice, said cage end wall being apertured to form a bleed orifice between the outside an adjacent inside bellows chambers, said bleed orifice connected bellows chambers and cylinder normally containing a liquid and said piston and other bellows chamber normally containing air or some other compressible medium.

2. A shock absorber for two relatively movable machine parts, comprising a hollow piston fixed to one part, a cylinder slidably engaging said piston and fixed to the other part, a plate having a main orifice therein closing the pressure end of said piston, a cage having a side wall and a closed outer end wall, said cage being fixed to said plate around said main orifice, an expansible bellows attached to said closed cage end wall with a portion thereof extending outside said cage end wall forming an outer chamber and another portion thereof extending inside said cage, a plate movable within said cage closing the inner end of said bellows, plural adjustable chambers arranged in series in said bellows including a closed air chamber at one end of said bellows adjacent said bellows closing plate and containing air or a like compressible medium, an intermediate liquid containing chamber between said air chamber and said closed cage end wall, said bellows outer chamber being a second liquid containing chamber, a bleed orifice between said liquid containing chambers, spring means for holding said bellows in an extended position, and a pin mounted on said bellows closing plate and movable therewith, said pin terminating adjacent to and concentric with said main orifice and movable to vary the aperture area of said main orifice thereby to control the amount of fluid flow therethrough.

References Cited in the file of this patent

UNITED STATES PATENTS

| | | |
|---|---|---|
| 2,095,112 | Wallace | Oct. 5, 1937 |
| 2,161,811 | Grebe | June 13, 1939 |
| 2,244,501 | Pierce | June 3, 1941 |
| 2,265,099 | Chenault | Dec. 2, 1941 |
| 2,308,404 | Thornhill | Jan. 12, 1943 |
| 2,537,491 | Thornhill | Jan. 9, 1951 |
| 2,716,470 | Focht | Aug. 30, 1955 |
| 2,735,515 | Cloudsley | Feb. 21, 1956 |
| 2,866,633 | Schnitzer | Dec. 30, 1958 |

FOREIGN PATENTS

| | | |
|---|---|---|
| 978,006 | France | Nov. 22, 1950 |